United States Patent
Delaruelle

(10) Patent No.: US 9,306,791 B2
(45) Date of Patent: Apr. 5, 2016

(54) METHOD FOR DESIGNING AN AMPLITUDE AND PHASE SHIFT KEYING CONSTELLATION

(71) Applicant: NEWTEC CY, Sint-Niklaas (BE)

(72) Inventor: Daniel Delaruelle, Sint-Niklaas (BE)

(73) Assignee: NEWTEC CY, Sint-Niklaas (BE)

( * ) Notice: Subject to any disclaimer, the term of this patent is extended or adjusted under 35 U.S.C. 154(b) by 0 days.

(21) Appl. No.: 14/767,687

(22) PCT Filed: Feb. 7, 2014

(86) PCT No.: PCT/EP2014/052482
§ 371 (c)(1),
(2) Date: Aug. 13, 2015

(87) PCT Pub. No.: WO2014/124880
PCT Pub. Date: Aug. 21, 2014

(65) Prior Publication Data
US 2015/0372852 A1    Dec. 24, 2015

Related U.S. Application Data

(60) Provisional application No. 61/764,646, filed on Feb. 14, 2013.

(51) Int. Cl.
*H04L 27/34* (2006.01)
*H04L 1/00* (2006.01)
(Continued)

(52) U.S. Cl.
CPC .......... *H04L 27/3411* (2013.01); *H04L 1/0057* (2013.01); *H04L 1/0071* (2013.01); *H04L 27/36* (2013.01); *H04L 27/38* (2013.01)

(58) Field of Classification Search
CPC .................. H04B 2201/709709; H04L 27/34; H04L 1/0041; H04L 2001/0098; H04L 27/3411; H04L 1/0071; H04L 27/36; H04L 27/38; H04L 1/0057
See application file for complete search history.

(56) References Cited

U.S. PATENT DOCUMENTS

| 6,353,911 B1 | 3/2002 | Brink |
| 7,123,663 B2 | 10/2006 | De Gaudenzi et al. |

(Continued)

FOREIGN PATENT DOCUMENTS

GB    2471876 A    1/2011

OTHER PUBLICATIONS

ETSI, "Digital Video Broadcasting (DVB); Second Generation Framing Structure, Channel Coding and Modulation Systems for Broadcasting, Interactive Services, News Gathering and Other Broadband Satellite Applications (DVB-S2)," ETSI EN 302 307, No. V1.3.1, Jul. 31, 2012, pp. 1-83, European Telecommunications Standards Institute (ETSI), Sophia-Antipolis, France.

(Continued)

*Primary Examiner* — Vineeta Panwalkar
(74) *Attorney, Agent, or Firm* — Workman Nydegger

(57) ABSTRACT

A method of digital modulation comprises generating a stream of modulation symbols in order to produce a modulated signal. The modulation symbols belong to a multi-ring digital signal constellation having all signal points placed on at least two concentric rings. The total number of signal points is larger than 8, and at least one ring has unequally spaced points constructed to form together with at least one neighbouring ring a subset of neighbouring rings. Each signal point of the subset has a unique angular coordinate modulo $2\pi$ and the angular spacing of the signal points of the subset is uniform.

3 Claims, 7 Drawing Sheets

(51) Int. Cl.
*H04L 27/36* (2006.01)
*H04L 27/38* (2006.01)

(56) References Cited

U.S. PATENT DOCUMENTS

| | | |
|---|---|---|
| 7,239,668 B2 | 7/2007 | De Gaudenzi et al. |
| 8,369,448 B2 | 2/2013 | Zhang et al. |
| 8,674,758 B2 * | 3/2014 | Eroz .................. H04L 1/004 329/304 |

OTHER PUBLICATIONS

International Search Report for corresponding International PCT Application No. PCT/EP2014/052482, Apr. 24, 2014.

Kayhan et al., "Constellation Design for Transmission Over Nonlinear Satellite Channels," Globecom, Oct. 5, 2012, pp. 3401-3406.

Shamai et al., "The Capacity of Average and Peak-Power-Limited Quadrature Gaussian Channels," IEEE Transactions on Information Theory, Jul. 1995, pp. 1060-1071, vol. 41, No. 4.

* cited by examiner

METHOD FOR DESIGNING AN AMPLITUDE AND PHASE SHIFT KEYING CONSTELLATION

FIELD OF THE INVENTION

The present invention is generally related to the field of digital communications systems. More in particular, it relates to Amplitude and Phase Shift Keying (APSK) constellations for a digital communications link.

BACKGROUND OF THE INVENTION

In the present invention an APSK constellation is considered for a digital communications link, for example a satellite communications link.

In a digital communications system one can, at the transmit side, often distinguish the processes of encoding and modulation. The information bits are first translated to a sequence of digital symbols (encoding) and subsequently the digital symbol sequence is translated to a continuous transmit waveform (modulation). The transmit waveform usually has a band-pass spectrum. It can then still be represented by an equivalent complex baseband transmit waveform having only low frequency components. The radio frequency waveform is obtained from the complex baseband waveform by quadrature modulation and possibly further frequency up-conversion. In so-called linear modulation schemes, the complex baseband waveform is obtained as the superposition of pulses of essentially finite duration, each pulse being the product of a complex-valued symbol with a delayed instance of a pulse known as the transmit filter impulse response. The finite set of complex-valued symbols is known as the constellation. A constellation is commonly represented as a set of M dots in a plane by interpreting the real and imaginary part of each of M symbol value as abscissa and ordinate with respect to orthonormal axes. In a Phase Shift Keying (PSK) constellation all dots are located on a circle. In an APSK constellation this restriction is lifted. Hereinafter the older term Quadrature Amplitude Modulation (QAM) will not be used as it is by some authors used as a synonym for APSK and by others to denote a special form of APSK where the dots are arranged in a dense rectangular or hexagonal grid.

The geometry of a constellation determines the theoretical constellation constrained mutual information rate achievable in a system with a given ratio of symbol energy to noise power density (SNR), and for the best possible binary or non-binary encoding. Digital communication systems often use binary encoding. In that the case the encoder in general does not directly map the message bits to symbols. Rather it maps the message bits to coded bits. Subsequently a group of code bits is used to designate a transmit symbol. The latter operation is commonly called bit mapping and the group of $\log_2 M$ code bits designating a transmit symbol from an M-ary constellation is called a bit label. This process is usually mirrored at the receive side by bit demapping, followed by binary decoding. The bit demapping and binary decoding process can be done iteratively, which technique is known as iterative demapping (as detailed for example in U.S. Pat. No. 6,353,911). This however entails significant complexity. Non-iterative demapping and binary coding/decoding may on the other hand entail a loss in capacity of the communication link compared to the Shannon capacity.

The loss can be mitigated by adapting the geometry and bit labelling of the constellation. The Figure-of-Merit of a particular choice of geometry and bit labelling under binary encoding and non-iterative demapping is often assessed by computing the so-called Bit Interleaved Coded Modulation (BICM) capacity. This BICM capacity is achievable but the converse has not been shown, i.e., it has not been proved that one cannot achieve higher rates than the BICM rate. Clearly, the ultimate performance criterion is the error rate performance of a coded modulation scheme. For details on BICM computation we refer to the paper '*Constellation Design for Transmission over Non-Linear Satellite Channels*' (F. Kayhan and G. Montorsi, Globecom 2012).

When designing constellations for use over non-linear channels, such as satellite channels, often multi-ring constellations with equally spaced signal points are adopted, as exemplified by U.S. Pat. No. 7,123,663, U.S. Pat. No. 7,239,668 and U.S. Pat. No. 8,369,448. In '*The capacity of average and peak-power-limited quadrature Gaussian channels*', (S. Shamai. and Bar-David I., IEEE Trans. Information Theory, Vol. 41, Issue 4, July 1995, pp. 1060-1071) a theoretical underpinning for such a design is given in the limiting case of an infinite number of constellation points and maximizing the capacity of a Gaussian additive quadrature symbol-input channel, hereinafter denoted as GAQC, with a symbol rate input and an average and peak SNR constraint. Shamai shows that a constellation structure with discrete concentric rings and a uniform angle distribution per ring is obtained for a peak SNR constraint. However, still for a symbol-input GAQC channel, when going to a finite number of points and using BICM capacity instead, it can be observed for in the paper of Kayhan that the ring structure is broken except for the outer ring. Note that the constellations published by Kayhan are obtained through simulation and there is no manual design guideline. When imposing quadrant symmetry, obviously the inner points occur in groups of 4 on a ring, but otherwise there is no apparent structure.

Another important aspect of digital communications is carrier synchronisation. Carrier synchronisation is needed because the channel modifies the signal phase between the transmitter output and the receiver input as a result of several factors, such as slow frequency drift effects due to ageing of oscillators and thermal effects the Doppler effect, caused by movement of terminals or relay devices, such as a satellite random phase fluctuations known as phase noise, occurring in local oscillators used for frequency conversion Carrier synchronisation commonly uses a feed-back mechanism known as a phase locked loop that adapts the phase of a local reference oscillator in the receiver, in order to track and cancel phase variations in the channel. The phase locked loop (PLL) comprises a phase error detector (PED) that measures the phase difference between the received symbols and said reference oscillator. The PED can make use of any a priori known symbols (called pilot symbols) or partially known symbols in the transmit symbol sequence. Inserting such symbols slightly reduces the capacity of the digital communication link to carry useful information. Therefore often the PED uses no such knowledge. This situation is known as non-data-aided (NDA) carrier synchronisation. Communication links comprising powerful error correction in general operate at low signal-to-noise ratios. In such conditions the system noise reduces the amount of phase information conveyed per symbol. This is especially true in NDA synchronizers, because the added noise introduces uncertainty regarding the value of a received symbol and consequently regarding the direction in which to adjust the local reference oscillator. The phase uncertainty introduced in this way by additive noise in the channel can be reduced by selecting a lower value for the loop noise bandwidth $B_L$ of the PLL. However, selecting a lower bandwidth also reduces the ability to track channel phase variations, so the selection of the loop noise bandwidth $B_L$ typically involves a trade-off between two phase error contributions; firstly, the residual phase uncertainty caused by limited filtering of additive noise effects, and, secondly, the residual non-tracked channel phase caused. It would obviously be desirable to limit as much as possible the phase error. It will however be readily understood by a person skilled in the art of digital communication that reducing the first contribution allows rebalancing the combined effect of both contributions achieving a better overall phase error performance.

Hence, there is a need for a solution where the drawbacks and limitations of the prior art solutions are overcome.

SUMMARY OF THE INVENTION

It is an object of embodiments of the present invention to provide for a constellation scheme that allows for improved performance and that also advantageously can be applied in a carrier synchronisation scheme.

The above objective is accomplished by the solution according to the present invention.

In a first aspect the invention relates to a of digital modulation comprising:
generating a stream of modulation symbols in order to produce a modulated signal, where said modulation symbols belong to a multi-ring digital signal constellation, said multi-ring digital signal constellation having all signal points placed on at least two concentric rings, whereby
a) the total number of signal points is larger than 8,
b) at least one ring has unequally spaced points, and
c) said at least one ring with unequally spaced signal points is constructed to form together with at least one neighbouring ring a subset of neighbouring rings, whereby each signal point of the subset has a unique angular coordinate modulo $2\pi$ and whereby the angular spacing of the signal points of the subset is uniform.

Use of the proposed constellation indeed yields an improved performance over prior art constellations. The performance improvement basically results from the additional degree of freedom, obtained by mitigating the constraint that all rings require equally spaced signal points. The regular structure of the subset of neighbouring rings with signal points having a uniform angular spacing substantially contributes to the better suitability of the constellation for the purpose of carrier synchronization, compared to prior art constellations lacking such regular angular structure.

In an advantageous embodiment the number of signal points placed on the outer ring is larger than the total number of signal points divided by the number of rings, so that the constellation is adapted for use on a non-linear communications channel.

In a preferred embodiment the unique angular coordinate of said signal points of said subset is given by $\theta_0+2k\pi/K$, with K denoting the number of signal points in said subset, k=0, 1, ..., K−1 and $\theta_0$ denoting a predetermined non-negative value smaller than $2k\pi/K$.

In one embodiment at least a ratio of ring radii of the at least two concentric rings is optimized for maximizing the Bit Interleaved Coded Modulation capacity for a Gaussian additive quadrature modulation symbol input channel with a predetermined peak signal-to-noise ratio.

In another embodiment at least a ratio of ring radii of the at least two concentric rings is optimized for minimizing an indication of a signal to noise ratio of a hard-limiting waveform input channel that achieves a predetermined frame error ratio for a predetermined forward error correction block code.

In preferred embodiments, adapted for code rates 128/180, 132/180 and 140/180, respectively, the digital signal constellation, denoted as 4+8+4+16APSK, has 32 points and four rings, the three outermost rings of said four rings having 8, 4 and 16 points, respectively. The outermost rings have a ratio with respect to the radius of the inner ring, essentially given by

| constellation adapted for | ring with 8 points | ring with 4 points | ring with 16 points |
|---|---|---|---|
| code rate 128/180 | 2.6 | 2.99 | 5.6 |
| code rate 132/180 | 2.6 | 2.86 | 5.6 |
| code rate 140/180 | 2.8 | 3.08 | 5.6 |

In an advantageous embodiment the method comprises a step of applying a binary low-density parity check code error correction block code to a stream of information bits and mapping the coded bits in order to obtain a stream of digital symbols to be modulated.

In another aspect the invention relates to a transmitter for a digital communication system comprising a modulator arranged for modulating a sequence of digital symbols. The digital symbols belong to a multi-ring constellation the multi-ring digital signal constellation having all signal points placed on at least two concentric rings, whereby
a) the total number of signal points is larger than 8,
b) at least one ring has unequally spaced points, and
c) said at least one ring with unequally spaced signal points is constructed to form together with at least one neighbouring ring a subset of neighbouring rings, whereby each signal point of said subset has a unique angular coordinate modulo $2\pi$ and whereby the angular spacing of the signal points of the subset is uniform.

Preferably the transmitter comprises an encoder for encoding a sequence of information bits and for outputting a sequence of coded bits and a bit mapper arranged for being fed with said sequence of coded bits and for obtaining said digital symbols by mapping said coded bits.

In another aspect the invention relates to a receiver for a digital communication system comprising a demodulator arranged for demodulating a sequence of digital symbols. The digital symbols belong to a multi-ring constellation said multi-ring digital signal constellation having all signal points placed on at least two concentric rings, whereby
a) the total number of signal points is larger than 8,
b) at least one ring has unequally spaced points, and
c) said at least one ring with unequally spaced signal points is constructed to form together with at least one neighbouring ring a subset of neighbouring rings, whereby each signal point of said subset has a unique angular coordinate modulo $2\pi$ and whereby the angular spacing of the signal points of the subset is uniform.

Preferably the receiver comprises a bit demapper arranged for being fed with the sequence of demodulated symbols from the demodulator and for demapping the demodulated symbols and a decoder arranged for receiving the demapped demodulated symbols and for obtaining bit values.

Advantageously, the bit demapper in the receiver is arranged for performing iterative demapping operations.

In a further aspect the invention also relates to a digital communication system comprising a transmitter as previously described and a receiver as described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
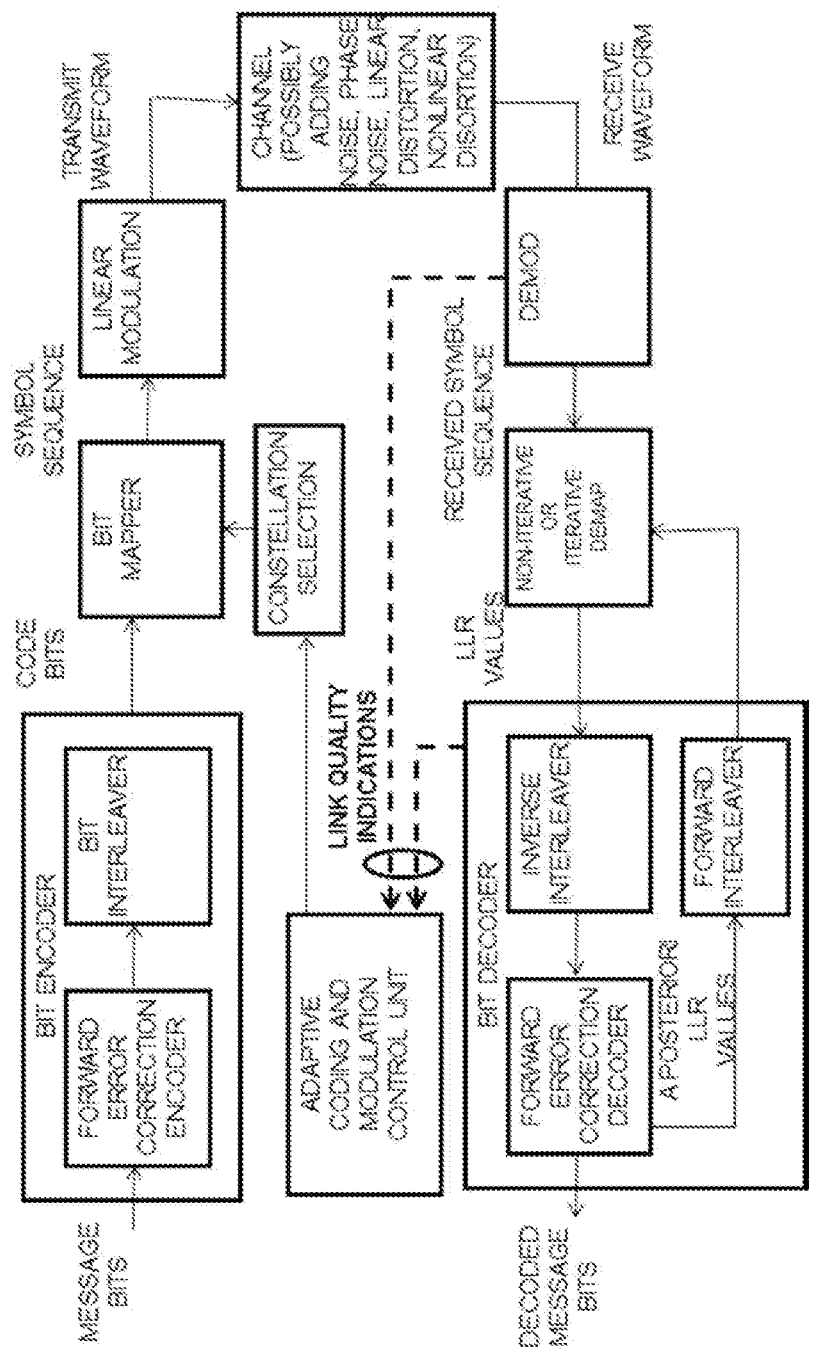
FIG. 1 illustrates a block diagram of a digital communications system employing constellations.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to a transmitter and a receiver for a digital communications system.

FIG. 1 shows a digital communications system. The incoming digital data is encoded with a forward error correcting code. This encoder can be a single encoder, but can also be the concatenation of several encoders. In case the encoder uses a binary code the output is a stream of coded bits. Then bits are mapped to symbols belonging to a certain constellation such as PSK, APSK or QAM. An interleaver may further reorder code bits prior to mapping in order to improve overall system performance. A person skilled in the art of digital communications will readily understand that the encoder, interleaver and mapper may at different times employ different code rules, interleaving rules and constellations. A person skilled in the art of digital communications will readily understand that rules and constellations may be varied using a fixed or adaptive pattern, techniques commonly known as variable coding and modulation (VCM) and adaptive coding and modulation (ACM). The present invention relates to a particular constellation design and therefore by extension to any digital communication system or scheme using this constellation design all the time or only a fraction of the time. A person skilled in the art of digital communications will readily understand that in addition a priori known symbols or partially a priori known symbols may be inserted for the purpose of assisting receiver synchronisation. A person skilled in the art of digital communications will understand that the values of the symbol sequence may be modified using any of known pre-distortion techniques in order to combat linear or non-linear distortion in the channel. The original or modified symbol sequence is then fed to a modulator applying transmit filtering and quadrature modulation. The modulator generates a waveform that is transmitted through a channel, such as a satellite communications channel. At the receiver side the waveform is demodulated to obtain the receive value of the symbols. The receive value of a symbol is not exactly equal to the transmit value, due to channel effects such as the addition of noise and distortion. The symbols are subsequently demapped. The demapper outputs for example likelihood ratios of the coded bits, which are next fed to the decoder. Like the encoder, the decoder can be composed of one or more concatenated decoders. A person skilled in the art of digital receivers will readily understand that one or more decoders can process the received information in an iterative manner and one or more decoders can also exchange information with the demapper in an iterative fashion, as illustrated in FIG. 1. Both the receiver and the decoder may provide information regarding the quality of the received signal, more in particular regarding the link margin. This information may be used by an adaptive coding and modulation unit to influence the selection of the current coding, interleaving, mapping and constellation parameters, to increase the availability or the throughput of the communications link.

Figure 2:
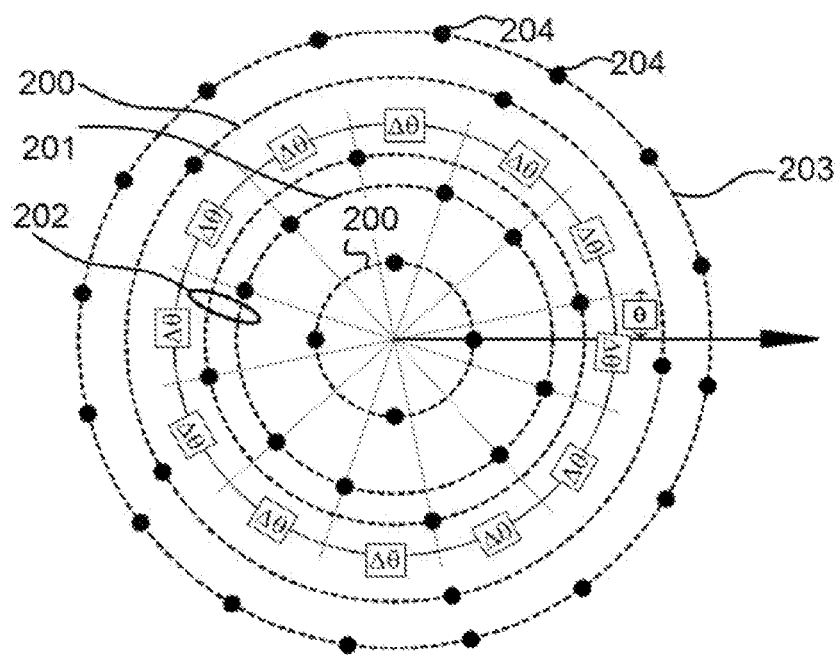
FIG. 2 illustrates a multi-ring constellation according to the invention.

FIG. 2 shows an APSK constellation according to the present invention. The constellation has signal points 204 placed on a set of concentric rings. The constellation may comprise rings 200 having equally spaced points. For any constellation according to the present invention, used during a transmission, the signal points on such a ring are defined by predetermining the ring radius, the number of points on the ring and the angular coordinate of one point. In order to optimize the capacity of the constellation to transfer information, at least one ring 201 has unequally spaced points. However, in order to facilitate receiver synchronisation, any ring with unequally spaced points is constructed to be within a subset of neighbouring rings 202, so that all signal points placed in said subset, the number of which is denoted as K, have unique angular coordinates $\theta_0+k\Delta\theta$, where k ranges from 0 to K−1 and $\Delta\theta=2\pi/K$. Hence, the signal points belonging to the subset have a uniform_angular spacing. As detailed below, selecting the angular coordinates of the signal points so that a regular structure is obtained, proves to be highly beneficial for performing carrier synchronisation, especially low-complexity carrier synchronization. This constitutes a substantial improvement compared to the constellations in the Kayhan paper. For any constellation according to the present invention, used during a transmission, the signal points in said subset of rings 202 are described by the predetermined ring radii for the subset of rings, the predetermined number of signal points K, the predetermined angular coordinate $\theta$ of a first signal point, and the predetermined association of each signal point to a particular ring (radius) in the subset.

Advantageously for digital communication through channels comprising non-linear elements, such as a satellite broadcast channel, the number of signal points located on the outer ring 203 exceeds the number of signal points in the constellation divided by the number of rings in the constellation.

A person skilled in the art of digital communications will readily understand that a same constellation geometry can be described using several equivalent descriptions. It is also obvious to a person skilled in the art that a common magnitude scaling factor can be applied to all constellation points without changing the scope of the invention, since this is equivalent to applying a signal amplification factor. Furthermore a common angular rotation may be applied to all constellation points without changing the scope of the invention, since this is equivalent to a transmit signal phase rotation.

Figure 3:
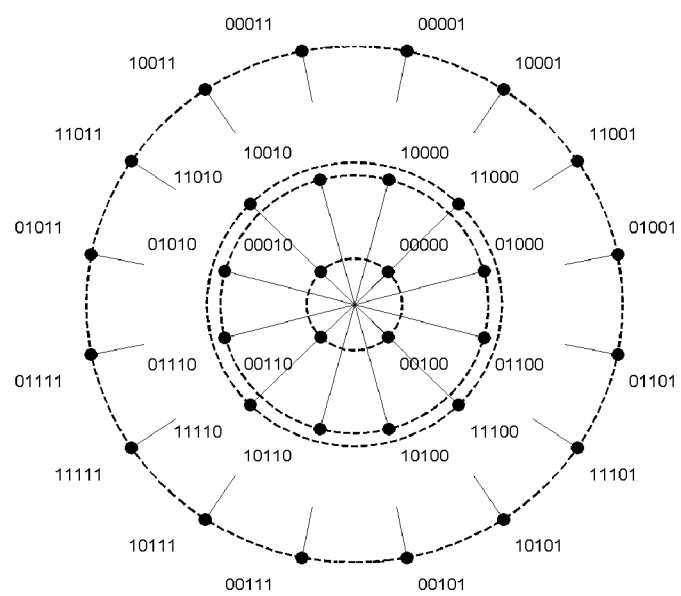
FIG. 3 illustrates the geometry and labelling of a 32-APSK constellation according to the invention.

FIG. 3 shows a 32APSK constellation geometry and bit labelling according to the present invention. It will be clear to someone skilled in the art of digital communications that the bit labelling shown may be substituted, for a 32-ary constellation, without changing the scope of the invention, by a bit labelling obtained by applying any of factorial(5)=120 permutations of the bit positions for all symbols in the constellation (where 5 is the number of bit positions in a constellation with 32 points); for example all bit labels XYZWU may be substituted by bit labels UXYZW. Likewise the bit labelling shown may be substituted, without changing the scope of the invention, by a bit labelling obtained by complementing any of $2^5=32$ subsets of the 5 label bits; for example for the singleton subset consisting of the $4^{th}$ bit, bit labels XYZ0U are swapped with bit labels XYZ1U. Likewise whenever a constellation geometry exhibits a symmetry, such as a rotational symmetry or mirror symmetry, then bit labels may obviously be permutated according to said symmetry, in order to obtain an equivalent constellation, without deviating from the scope of the invention.

Advantages of the constellation according to the invention over constellations in prior art are now presented. Advantages are illustrated in at least one of the following characteristics: the capacity to carry information, especially over a non-linear channel, and the suitability for carrier synchronisation in terms of synchronisation performance and complexity. This is argued and illustrated for 32-ary constellations. It will be clear to someone skilled in the art of digital communications that a same argumentation of the advantages of the distinguishing features of the multi-ring constellation design in FIG. 2 could be applied to APSK constellation designs with a different number of points, for example to 64APSK.

Figure 4:
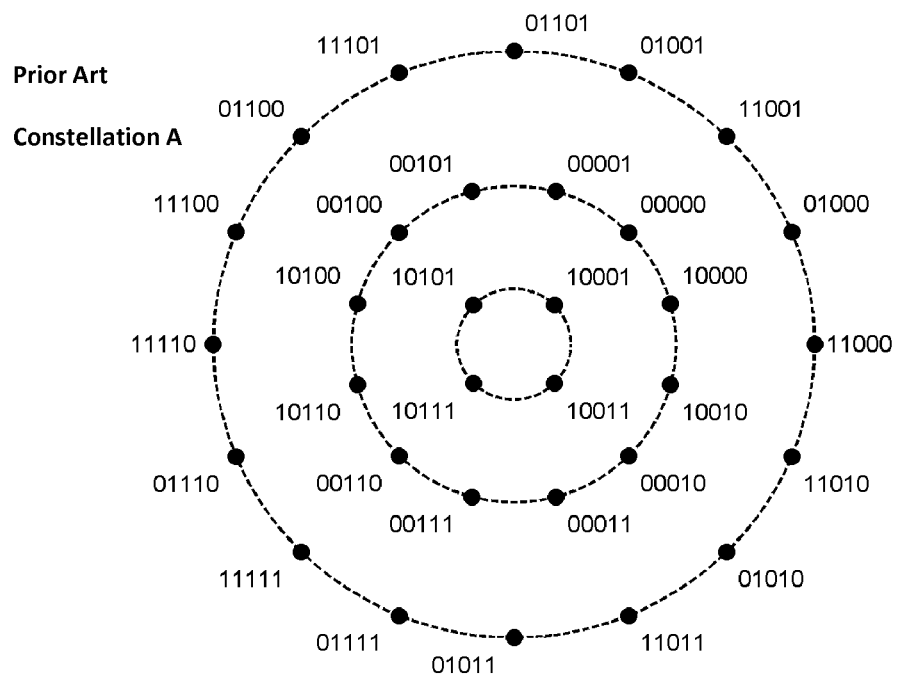
FIG. 4 illustrates the geometry and labelling of a prior art 32-APSK constellation, hereinafter denoted as constellation A, featured in (ETSI EN 302 307 v1.2.1: *Second generation framing structure, channel coding and modulation systems for Broadcasting, Interactive Services, News Gathering and other broadband satellite applications*), hereinafter called the DVB-S2 standard. It serves as a reference case in the performance computations and simulations.

FIG. 4 depicts a first prior art constellation geometry and labelling, hereafter denoted as constellation A. This constellation is specified in the DVB-S2 standard and has a multi-ring structure with equally spaced points on each ring. The ring radii of this prior art constellation are adapted to the code rate according to the DVB-S2 standard.

Another prior art constellation, described in U.S. Pat. No. 8,369,448 and hereinafter referred to as A*, differs from constellation A only in the bit labelling. The bit labelling in U.S. Pat. No. 8,369,448 however does not increase nor decrease any of the advantages illustrated hereinafter. Hence any illustration of an improvement of a constellation according to the present invention over prior art constellation A is understood to also describe a verified identical improvement over prior art constellation A*. This is only made explicit in FIG. 6.

Figure 5:
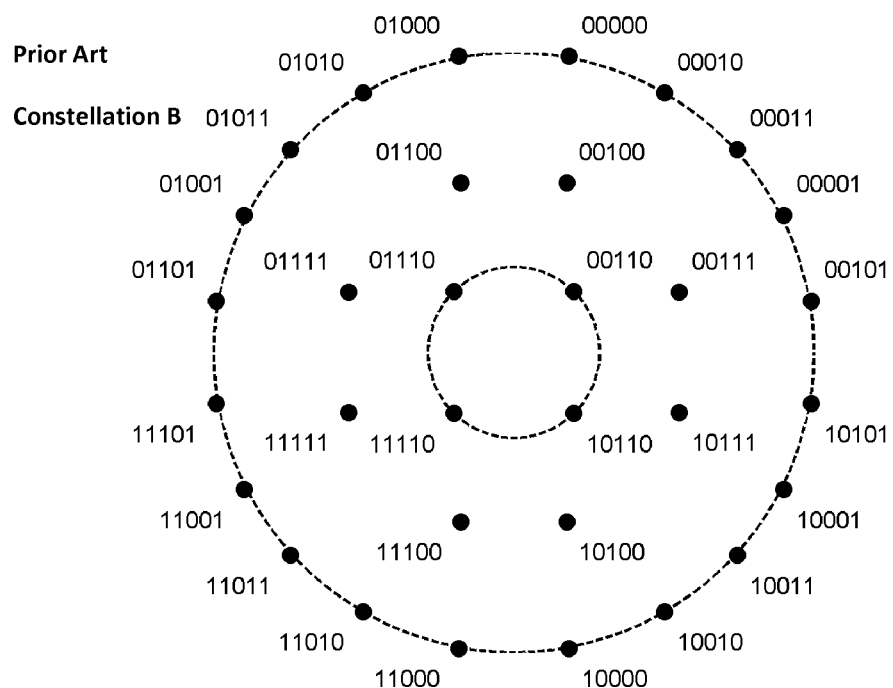
FIG. 5 illustrates the geometry and labelling of another prior art 32-APSK constellation, hereinafter denoted as constellation B, reported by Kayhan as a scheme optimized for a peak SNR of 15 dB. It serves as a reference case in the performance computations and simulations.

FIG. 5 depicts a further prior art constellation geometry and labelling, hereafter denoted as constellation B. It is obtained in the Kayhan paper as a constellation geometry and bit labelling maximizing the BICM capacity for a GAQM symbol input channel with peak SNR set equal to 15 dB. It is a multi-ring constellation where at least the outer ring is unequally spaced and not member of a subset of rings whose signal points have angular coordinates expressed as $\theta_0 + k\Delta\theta$.

Figure 6:
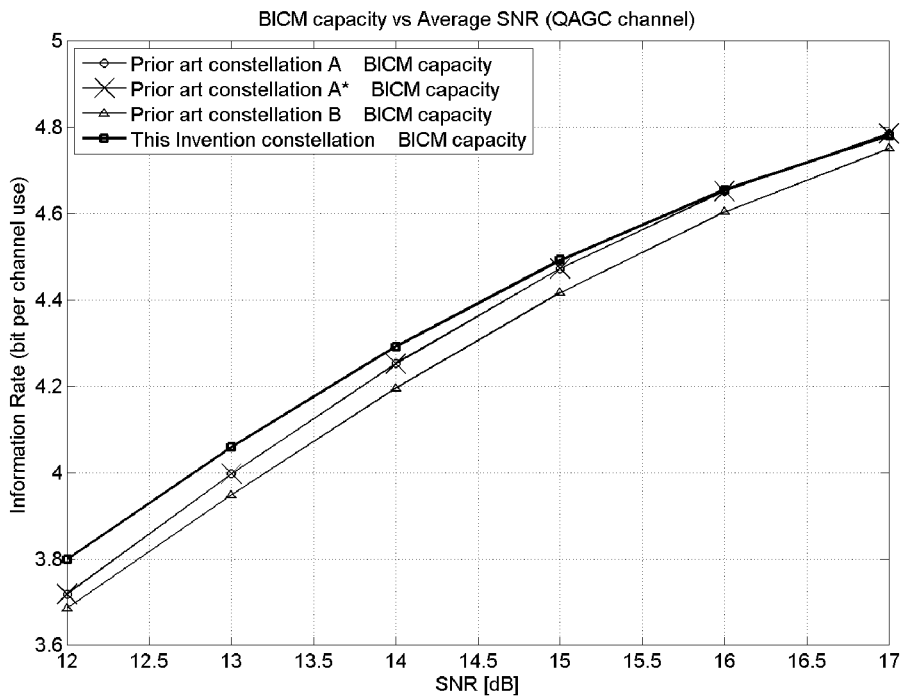
FIG. 6 illustrates the computed BICM capacity as a function of average SNR, for said 32-APSK constellation according to the invention and prior art constellations A, A* and B, where A* has a bit labelling as reported in U.S. Pat. No. 8,369,448.

FIG. 6 illustrates the computed BICM capacity, of a GACM symbol input channel with given average SNR, for the 32APSK constellation according to this invention, compared to the prior art constellations A and B. In summary for information rates below 4.4 bit per channel use the required SNR advantage of the constellation according to this invention is 0.1 to 0.5 dB compared to prior art constellation A and about 0.5 dB compared to prior art constellation B. As explained in the background section, the BICM capacity of the GACM symbol input channel is a known good performance ranking predictor for linear channels. Even though the focus is further on the performance advantages for a non-linear channel, it is seen here that the constellation according to the present invention is better adapted to linear channels than the prior art constellations A and B.

Figure 7:
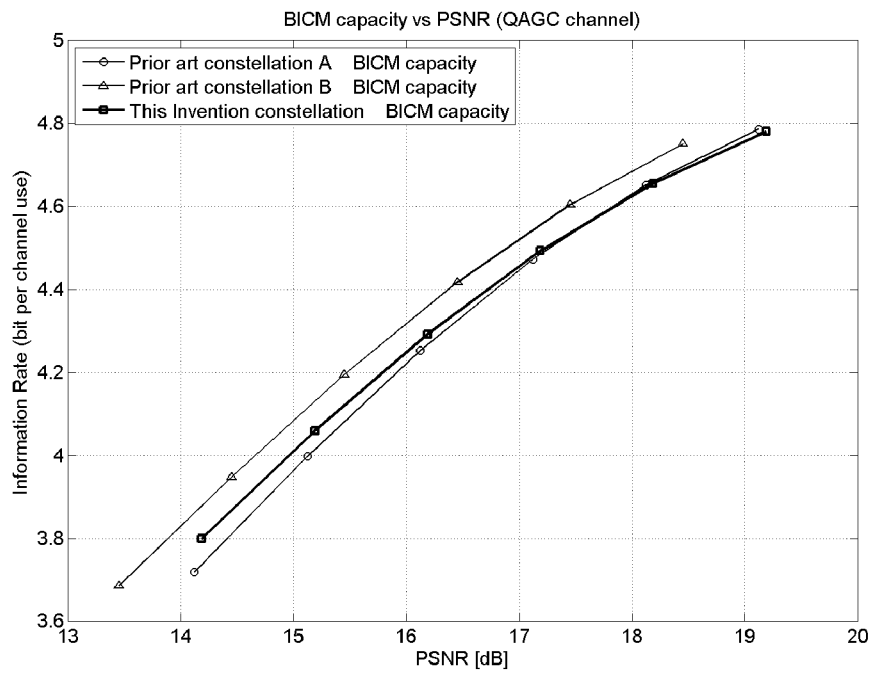
FIG. 7 illustrates the computed BICM capacity as a function of peak SNR, for said 32-APSK constellation according to the invention and prior art constellations A and B.

FIG. 7 illustrates the computed BICM capacity of a GACM symbol input channel with given peak SNR, for the 32APSK constellation according to this invention, compared to the prior art constellations A and B. Since the BICM capacity of a GACM symbol input channel with given peak SNR was the design criterion in Kayhan, it is not surprising to see that constellation B performs better according to this criterion. The constellation according to the present invention still maintains an advantage with respect to prior art constellation A, according to this criterion. However, said criterion for a symbol input channel does not capture all aspects, in particular the finer details, of a non-linear continuous waveform input channel.

Figure 8:
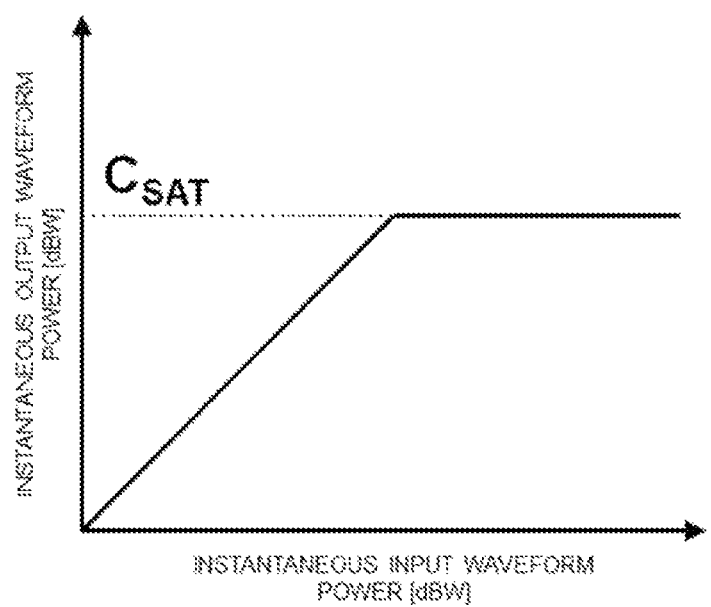
FIG. 8 illustrates an AM/AM law of the channel amplifier in a hard-limiting channel.
Figure 9:
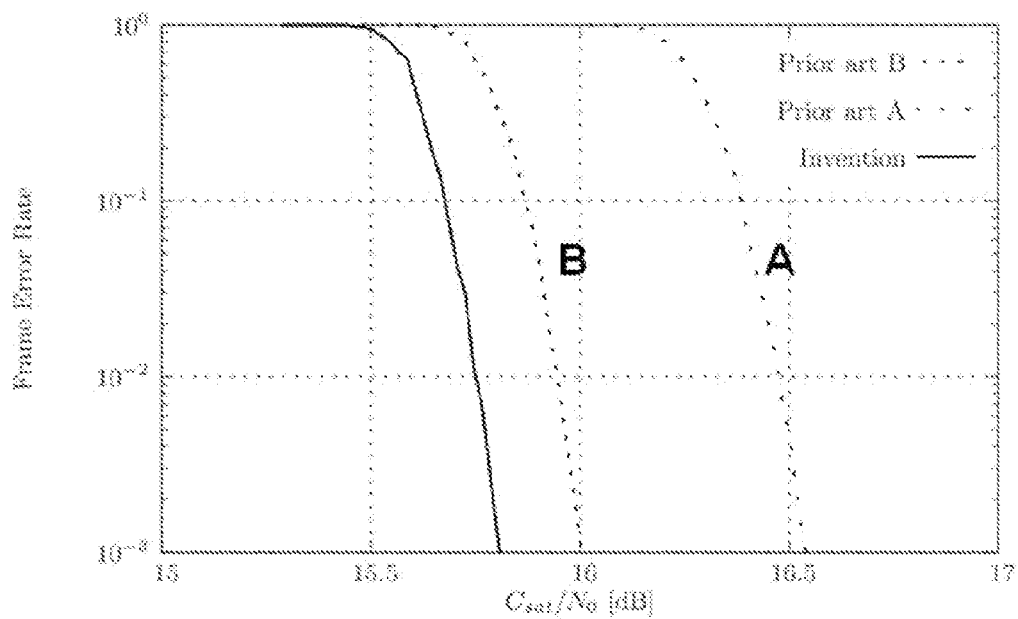
FIG. 9 illustrates the simulated Frame Error Rate performance for said 32-APSK constellation according to the invention and prior art constellations A and B, each constellation being used in combination with a rate 5/6 LDPC code and transmission over a hard-limiting channel.
Figure 10:
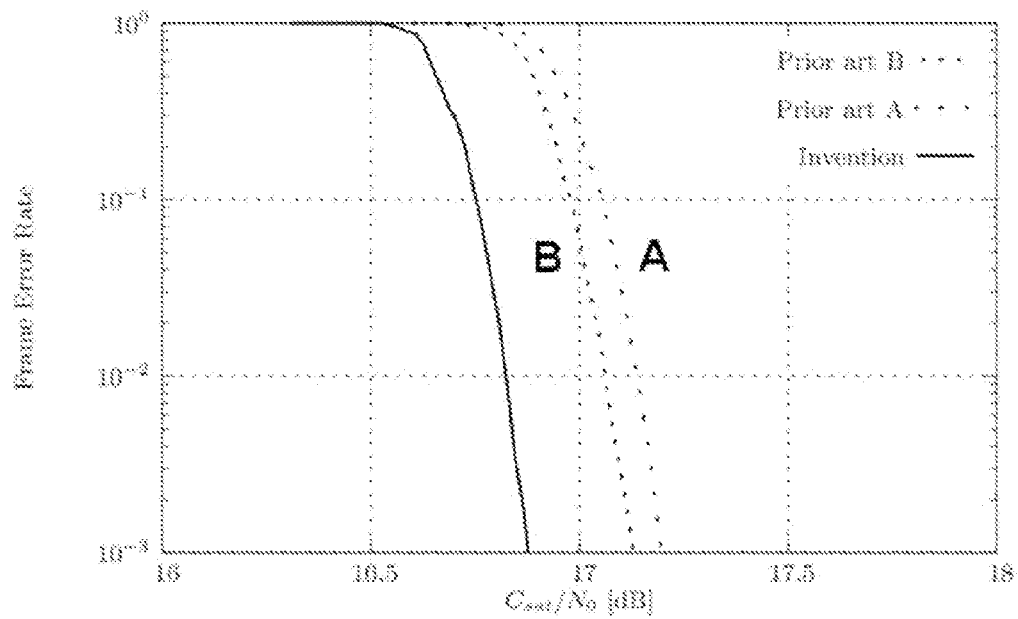
FIG. 10 illustrates the simulated Frame Error Rate performance for said 32-APSK constellation according to the invention and prior art constellations A and B, each constellation being used in combination with a rate 7/9 LDPC code and transmission over a hard-limiting channel.

Therefore in FIG. 9 and FIG. 10 the simulated performance is examined over a non-linear waveform input channel with a non-linear characteristic shown in FIG. 8, the so-called hard-limiting channel. This non-linear channel is regarded as a good approximation of non-linear amplifiers with linearizing circuits, such as used in virtually all current satellite transponder designs. In FIG. 9 the performance is illustrated with a rate 5/6 low-density-parity check code with length 64800 code bits and a row-column bit interleaver, adapted for each constellation to the particular constellation labelling, in order to have a fair comparison. In FIG. 10 the code rate is changed to 7/9. For prior art constellation A, ring radii as defined in the DVB-S2 standard are used for code rate 5/6; for code rate 7/9=0.777, the ring radii defined in the DVB-S2 standard for the nearest code rate 3/4=0.750 are adopted.

It is seen that the constellation according the present invention performs better than the prior art constellations. The results indicate that a detailed performance ranking of modulation schemes is not achieved when using as design criterion the BICM capacity for a peak SNR constrained GACM symbol input channel model.

FIG. 9 and FIG. 10 also illustrate the applicability of constellations according to the invention, when combined with error-correction-codes and for a non-linear channel model representative of a satellite broadcast channel.

Advantageously, the ring radii of the 32-APSK constellation according to the invention shown in FIG. 3 are adapted for providing low SNR thresholds when used on a non-linear channel in combination with LDPC codes of rate 128/180, 132/180 and 140/180. In particular it is beneficial, for a hard-limiting non-linear channel representative of a satellite broadcast channel, to use a ratio of the ring radii of the three outermost rings to the radius of the inner ring, for each of said code rates, as shown in the table below. The resulting SNR threshold, expressed as a $C_{sat}/N_o$ value, for a state-of-the art LDPC with a design similar to the code design in the DVB-S2 standard, and for a baseband filter with excess bandwidth 10%, was computed to have the value as also shown in the table below.

| constellation adapted for | ratio of radius of ring with 8 points | ratio of radius of ring with 4 points | ratio of radius of ring with 16 points | Csat/No threshold (in dB) |
|---|---|---|---|---|
| code rate 128/180 | 2.6 | 2.99 | 5.6 | 14.50 |
| code rate 132/180 | 2.6 | 2.86 | 5.6 | 14.91 |
| code rate 140/180 | 2.8 | 3.08 | 5.6 | 15.84 |

Figure 11:
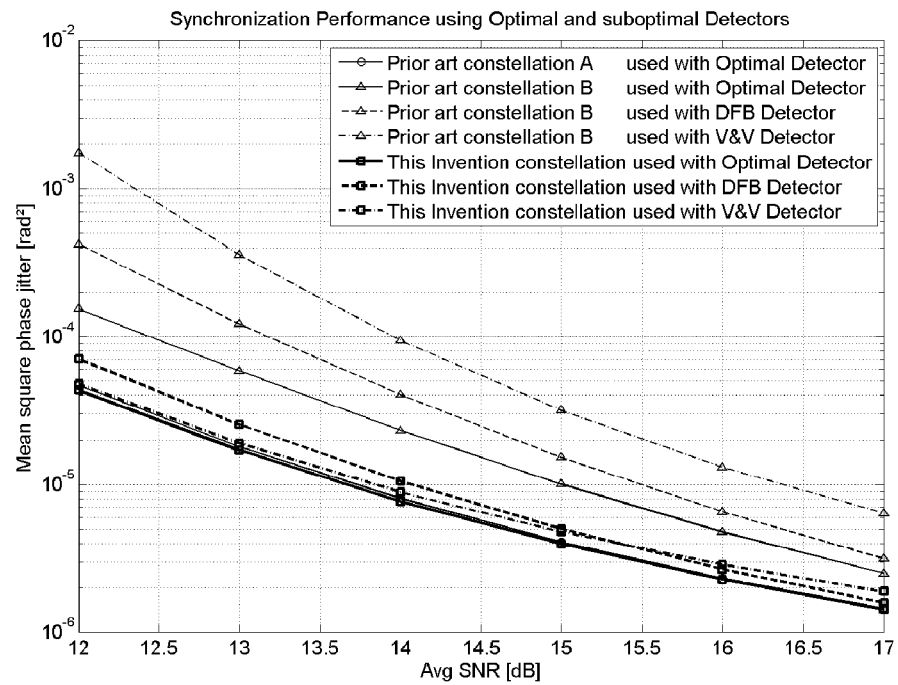
FIG. 11 illustrates the computed carrier synchronization jitter as a function of the average SNR, for said 32-APSK constellation according to the invention and prior art constellations A and B.
Figure 12:
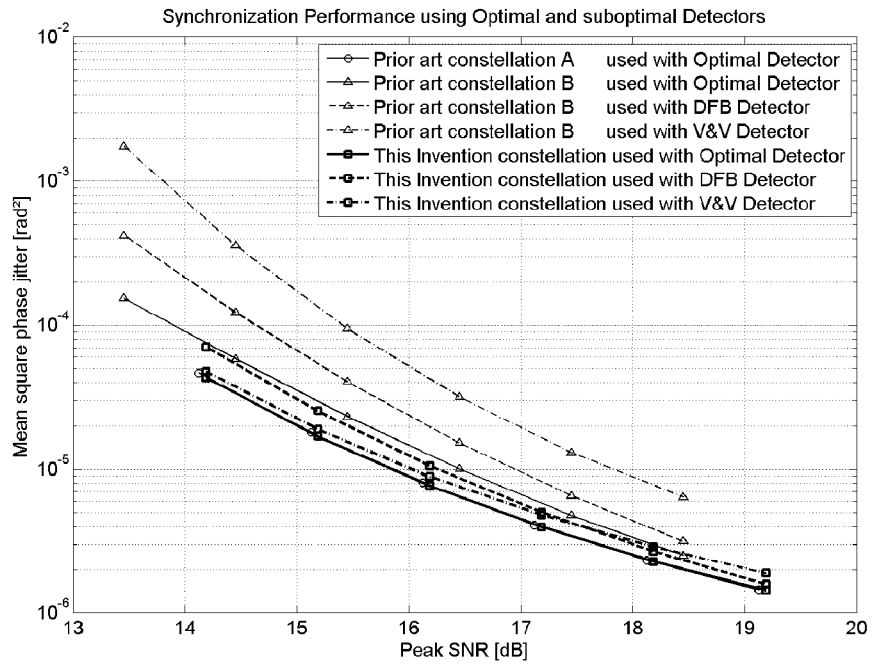
FIG. 12 illustrates the computed carrier synchronization jitter as a function of the peak SNR, for said 32-APSK constellation according to the invention and prior art constellations A and B.

In FIG. 11 and FIG. 12 the advantage is illustrated of a 32-APSK constellation according to the present invention regarding the level of the phase error contribution due to additive channel noise in a NDA carrier synchronizer circuit. This advantage can be exploited to achieve a reduced overall phase error when also other sources of phase error, in particular channel phase noise in radio links, are present. Especially, in NDA carrier synchronizers phase error contribution due to additive channel noise depends strongly on the constellation design, on the signal-to-noise ratio parameter SNR or peak SNR, on the particular phase error detector (PED) used in the carrier PLL and on the loop noise bandwidth $B_L$ of this PLL relative to the transmit symbol rate. The results in FIG. 11 and FIG. 12 apply to a loop bandwidth $B_L$ of 0.01% times the transmit symbol rate. The considered phase detectors are a) an optimal detector
b) a decision feedback (DFB) detector
c) a so-called Viterbi & Viterbi (V&V) detector with angular periodicity adapted to the number of points on the outer ring of each constellation.

An optimal PED is defined as any synchronizer with a performance expressed by $$Var\{\theta_\varepsilon^2\} = -\frac{1}{E_y\left[\frac{\partial^2 p(y|\theta)}{\partial^2 \theta}\right]} \cdot \frac{B_L}{F_{SYMBOL}} \quad [rad^2]$$

where Var$\{\theta_\epsilon^2\}$ is the mean-square value of the phase error $\theta_\epsilon$ and $p(y|\theta)$ is the probability density for observing a complex AWGN channel output symbol value y for a single receive symbol suffering a residual phase rotation $\theta$. $E_y$ denotes an averaging over all possible output values of the channel, in principle the entire complex plane. An example of an optimal PED is a PED converting the measured complex channel output value y into a scalar output value $$PED(y) \propto \frac{1}{p} \frac{\partial p(y|\theta)}{\partial \theta}$$

to within a fixed scale factor, or realizing any function substantially equal to this in a region of the complex plane including all constellation points. As is as well known to a person skilled in the art, such a scale factor is equivalent to a fixed gain in the PLL and is compensated when choosing circuit components or scale factors in an analogue or digital implementation of a PLL, adapted to realize a preset loop noise bandwidth.

The different PED considered here differ significantly in complexity. Approximating the optimal detector is very complex for higher order modulations. A decision feedback detector also has substantial complexity, as it involves computing the hard-decision value of a received symbol. Furthermore both the optimal and decision feedback detector are for most higher order constellations very sensitive to errors in the measured signal level.

It is seen from FIG. 11 and FIG. 12 that the jitter contribution is substantially higher for prior art constellation B, especially when using the simpler Viterbi and Viterbi detector. For the constellation according to this invention, little performance is lost when using the simpler V&V detector, compared to using the optimum detector. This difference in behaviour can be attributed to the regular angular spacing maintained by the constellations according to the present invention but not in the constellations designed according to the paper of Kayhan, for example prior art constellation B.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A transmitter for a digital communication system comprising:
    a modulator arranged for modulating a sequence of digital symbols, wherein said digital symbols belong to a multi-ring constellation said multi-ring digital signal constellation having all signal points placed on at least two concentric rings, wherein
        a) the total number of signal points is larger than 8,
        b) at least one ring has unequally spaced points, and
        c) said at least one ring with unequally spaced signal points is constructed to form together with at least one neighbouring ring a subset of neighbouring rings, wherein each signal point of said subset has a unique angular coordinate modulo $2\pi$ and wherein the angular spacing of the signal points of said subset is uniform;
    an encoder for encoding a sequence of information bits and for outputting a sequence of coded bits; and
    a bit mapper arranged for being fed with said sequence of coded bits and for obtaining said digital symbols by mapping said coded bits.

2. A receiver for a digital communication system comprising:
    a demodulator arranged for demodulating a sequence of digital symbols, wherein said digital symbols belong to a multi-ring constellation said multi-ring digital signal constellation having all signal points placed on at least two concentric rings, wherein:
        a) the total number of signal points is larger than 8,
        b) at least one ring has unequally spaced points, and
        c) said at least one ring with unequally spaced signal points is constructed to form together with at least one neighbouring ring a subset of neighbouring rings, wherein each signal point of said subset has a unique angular coordinate modulo $2\pi$ and wherein the angular spacing of the signal points of said subset is uniform;
    a bit demapper arranged for being fed with said sequence of demodulated symbols from said demodulator and for demapping said demodulated symbols; and
    a decoder arranged for receiving said demapped demodulated symbols and for obtaining bit values.

3. The receiver for a digital communication system as in claim 2, wherein said bit demapper is arranged for performing iterative demapping operations.

* * * * *